United States Patent [19]
Mariol

[11] Patent Number: 4,934,025
[45] Date of Patent: Jun. 19, 1990

[54] HINGE FOR A CENTER FOLD PLAY YARD

[76] Inventor: John V. Mariol, 7163 Honeywood Ct., Cincinnati, Ohio 45230

[21] Appl. No.: 266,619

[22] Filed: Nov. 3, 1988

[51] Int. Cl.⁵ .............................................. E05D 11/10
[52] U.S. Cl. ........................................ 16/347; 16/371; 16/374; 16/376; 16/387; 16/DIG. 41; 5/99 A; 403/102
[58] Field of Search ................. 16/239, 319, 343, 344, 16/347, 354, 363, 374, 376, 387, DIG. 41, 253, 377, 231, 366, 367, 371, 365; 5/99 C, 99 R, 176 R, 176 B, 177, 99 A; 403/102, 113, 117, 161; 256/26

[56] References Cited
U.S. PATENT DOCUMENTS

| | | | |
|---|---|---|---|
| 952,871 | 3/1910 | Browder | 403/102 |
| 2,133,692 | 10/1938 | Gittings et al. | 403/102 |
| 3,801,208 | 4/1974 | Bourgraf et al. | 403/102 |
| 4,532,674 | 8/1985 | Tobey et al. | 16/387 |
| 4,702,719 | 10/1987 | Lapid | 16/374 |

FOREIGN PATENT DOCUMENTS 3903 of 1889 United Kingdom ................. 16/387

Primary Examiner—Richard K. Seidel
Assistant Examiner—Edward A. Brown
Attorney, Agent, or Firm—Donald R. Bahr

[57] ABSTRACT

An improved play yard having a lower horizontal support formed of rails, an upper horizontal support formed of rails and vertical support rails pivotably coupled therebetween, a central hub pivotably coupling the radially interior ends of the rails of the lower horizontal support and hinges coupling the rails of the upper horizontal support at intermediate locations. The hinges are adapted to be rotated about their axes between a locked position wherein the play yard is secure for operation and use and an unlocked position wherein the upper rails may be pivoted and the entire play yard collapsed upon the raising of the hub. Also disclosed is the hinge per se.

4 Claims, 3 Drawing Sheets

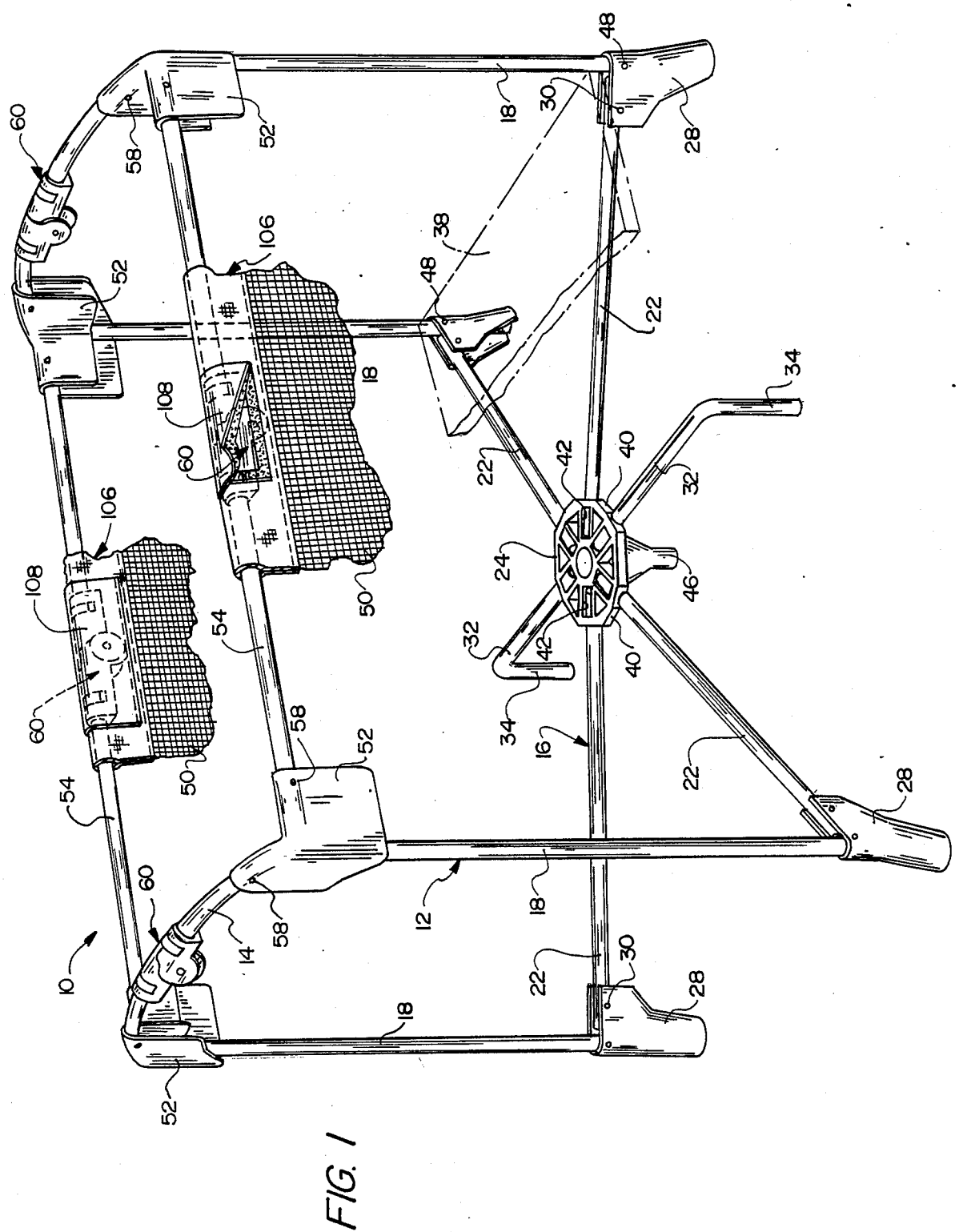
FIG. I

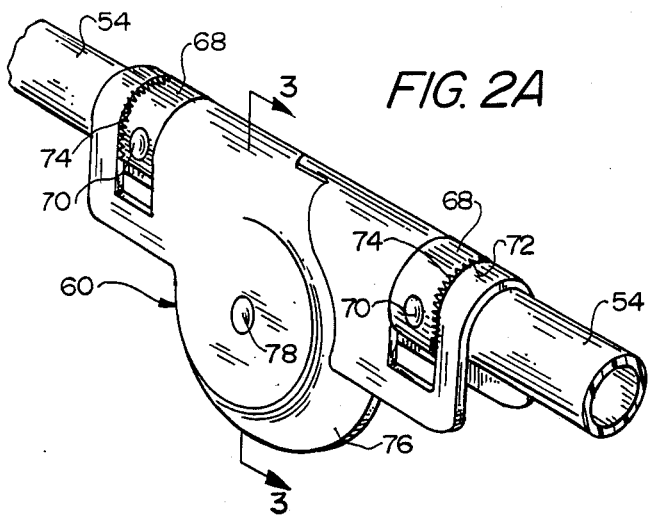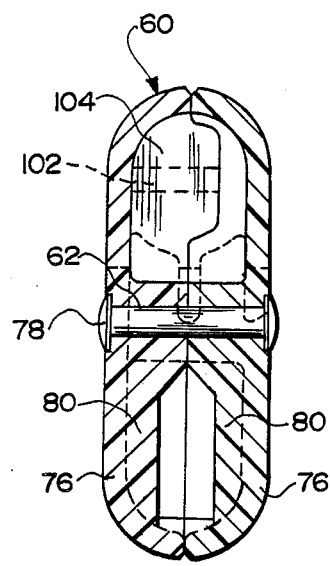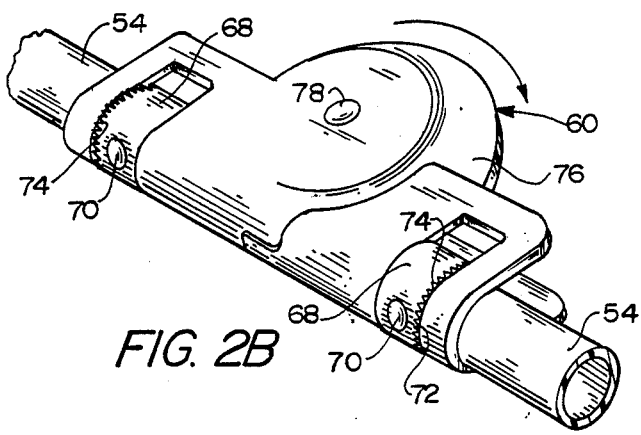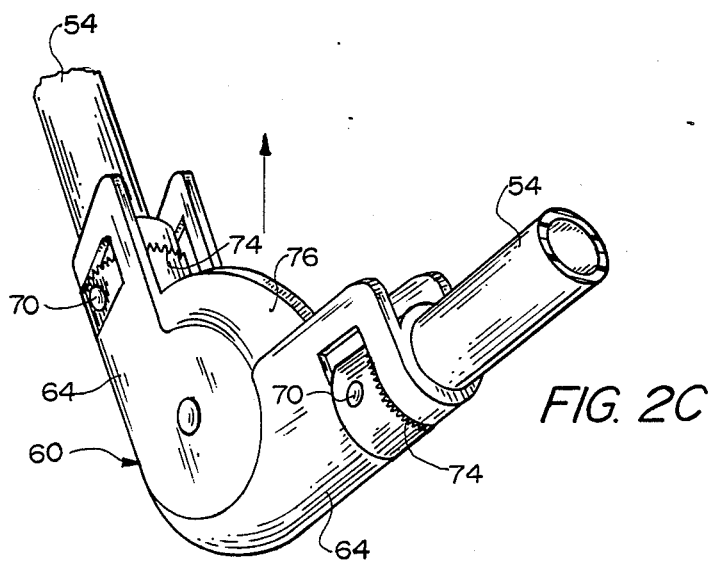

HINGE FOR A CENTER FOLD PLAY YARD

BACKGROUND OF THE INVENTION

1. Field Of The Invention

This invention relates to a foldable play yard with improved locking and folding mechanisms and, more particularly, to improved hinges for center fold play yards and other applications.

2. Description Of The Background Art

A wide variety of play yards, previously referred to as play pens, have been designed, developed and commercialized for many years. Such play yards have frequently been foldable, being of the knock-down type. These foldable play yards featured various types of frame assemblies with various types of locking and folding mechanisms including hinges rendering their folding and unfolding of varying degrees of complexity.

Types of foldable play yards are described in U.S. Pat. Nos. 4,688,280 and 4,739,527 to Kohus and in U.S. Pat. No. 4,008,499 to Wren. According to those disclosures, the lower frame structure radiates outwardly from a central hub. Types of frame structures with central hubs for use in other than play yards are disclosed in U.S. Pat. No. 2,197,791 to Eddy; U.S. Pat. No. 2,962,034 to Finlayson and U.S. Pat. No. 3,810,482 to Beavers.

Locking and folding mechanisms which include positive securement features are disclosed in U.S. Pat. No. 663,857 to Browder and U.S. Pat. No. 2,711,328 to Shone.

Lastly, other foldable play yards with features of interest are disclosed in U.S. Pat. No. 4,069,524 to Carlo; U.S. Pat. No. 4,357,735 to Saint; U.S. Pat. No. 4,376,318 to Cirillo and U.S. Pat. No. 4,483,026 to Kassai.

While the prior art generally, and the above referred to patents in particular, disclose various features which might find utility in foldable play yards and hinges, none disclose the structure by which applicant's play yard may be readily assembled and disassembled by an operator and positively secured in position for more safe, efficient, convenient and economical use.

Therefore, it is an object of this invention to provide an improved play yard with a collapsible frame assembly with safe and easy to use hinges which overcome the inadequacies of the background art and which constitutes an improvement which is a significant contribution to the advancement of play yards and hinges generally.

It is a further object of the present invention to provide an improved play yard wherein all operating components including stops are internal to their rotating and pivoting hinge.

It is a further object of the present invention to provide hinges wherein there are no pinch points which would allow a dangerous condition to exist.

It is a further object of the present invention to construct a play yard with a minimum number of parts required for operation to improve simplicity, efficiency, convenience and cost.

Lastly, it is an object of the present invention to more safely, efficiently, conveniently and economically fabricate and use hinges as for foldable play yards.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention comprises a play yard having a lower horizontal support formed of rails, an upper horizontal support formed of rails and vertical support rails pivotably coupled therebetween, a central hub pivotably coupling the radially interior ends of the rails of the lower horizontal support and hinges coupling the rails of the upper horizontal support at intermediate locations, the hinges being adapted to be rotated about their axes between a locked position wherein the play yard is secure for operation and use and an unlocked position wherein the upper rails may be pivoted and the entire play yard collapsed upon the raising of the hub. Each hinge is formed of mating hinge halves joined by a pivot pin perpendicular to, but offset from, the axis of rotation of the hinge halves, whereby pivoting of the hinge halves about the pivot pin allows for assembly and collapse of the play yard. The play yard further includes each horizontal support rail and with a circumferential slot in each hinge half adapted to receive a ring for guiding the rotational motion of the hinge with respect to the rings and rails. The play yard further includes cooperable ratchet teeth on each ring and hinge half for securing the hinge in location at either the locked position during operation and use of the play yard or the unlocked position during collapse of the play yard. The play yard further includes abutment means on each hinge half to limit the pivoting of the hinge halves and rails between an assembled position wherein the hinge halves and their supported rails are in alignment and a collapsed position wherein the hinge halves and rails are essentially parallel with each other.

The invention may also be incorporated into an improved hinge comprising mating first and second halves, each half with an axial bore adapted to receive members to be pivoted with the hinge, an offset portion formed in each hinge half with a pivot pin extending centrally therethrough, the mating halves adapted to be pivoted about the axis of the pivot pin which is perpendicular to, but offset from the axes of the bores and the hinge, interference members located on the mating faces of the hinge halves to limit the degree of pivoting of the hinge halves with respect to each other, circumferential slots extending through the surface of each hinge half for receiving a radially projecting ring securable to the received members to guide the rotational motion of the hinge with respect to the ring and received members. The hinge further includes abutment surfaces on each ring and hinge half cooperage to limit the rotation of the hinge and thereby locate the offset portion vertically upwardly when the hinge is in the unlocked position and to locate the offset portion vertically downwardly when the hinge is in the locked position. The ring is a formed with ratchet teeth extending from one surface thereof cooperage with ratchet teeth in the adjacent hinge half for thereby securing the hinge in a locked or unlocked rotational orientation.

Lastly, the invention may also be incorporated into an improved hinge comprising mating first and second portions, an offset region formed in each hinge portion with a pivot pin extending centrally therethrough, the mating portions adapted to be pivoted about the pivot pin perpendicularly to, but offset from, the axis of the hinge, the hinge being rotatable about its axis between a first orientation wherein the hinge portions are unlocked and may be pivoted and a second orientation wherein the hinge portions are locked and may not be pivoted.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 1 is a perspective illustration of a foldable play yard constructed in accordance with the principles of the present invention.

FIGS. 2A, 2B and 2C are perspective showings of a hinge of FIG. 1 illustrating its movement between its various positions.

FIG. 3 is a sectional view of the hinge of FIGS. 1 and 2 taken along line 3—3 of FIG. 2.

Similar referenced characters refer to similar parts throughout the several Figures.

DETAILED DESCRIPTION OF THE INVENTION

Figure 5:
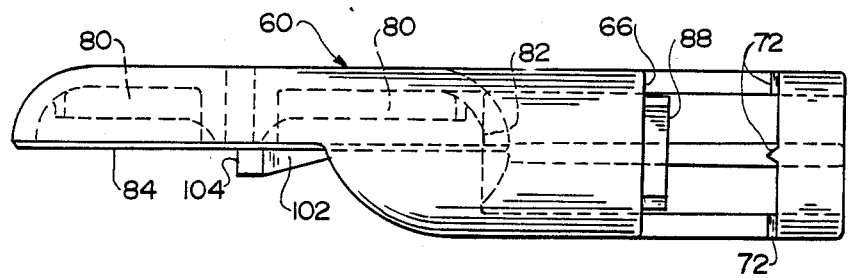
FIGS. 4, 5 and 6 are elevational, plan and end views of one hinge half of FIGS. 1, 2 and 3.

With particular reference to FIG. 1, there is shown a perspective illustration of a play yard 10 constructed in accordance with the principles of the present invention. The frame assembly 12 includes an upper horizontal support, a lower horizontal support 16 and vertical support rails 18 pivotally coupled therebetween.

The lower horizontal support 16 is fabricated of a plurality of rails 22 centrally coupled to a hub 24 by pivot pins. Four (4) of such rails 22 extend in a generally radial configuration and are pivotally secured to foot brackets 28 by pins 30. Additional rails 32 extend from the hub 24 with down-turned segments 34, the lower ends of which are adapted to be supported on the floor when the play yard is assembled for operation and use.

The central hub 24 has an upper surface which cooperates with the lower horizontal support rails 22 and 32 to constitute an essentially horizontal surface for supporting a play yard floor 38, partially shown in FIG. 1. Downwardly extending walls 40 depend from the lower surface of the hub for defining spaces for the receipt of the radially inward ends of the rails of the lower horizontal support 16. Pivot pins extent through the downwardly extending walls 40 and through the rails whereby, when the central hub is lifted, the rails will pivot around their pins. Their inward ends will extend upwardly through apertures 42 in the hub to allow the major extents of the rails to depend downwardly, parallel with each other when fully folded and the play yard collapsed. In addition, a central depending foot 46 is formed to extend downwardly from the hub onto the floor for additional support when assembled for operation and use.

The radially exterior ends of the rails of the lower horizontal support 16 are coupled by pivot pins 30 to foot brackets 28 at each corner of the play yard. Each bracket is, in turn, permanently secured by rivets 48 to a lower region of a vertical support rail 18. Securement is at a height so that the lowermost portions of the vertical support rails 18 will constitute legs for elevating the floor 38 of the play yard in proper orientation above the floor for maximum convenience.

A removable play yard 38 floor is positioned upon the lower horizontal support 16 for operation and use in the conventional manner. Similarly, the sides 50 of the play yard between the upper and lower horizontal supports 14 and 16 is covered with side members 50, which may be of the conventional variety, and shown in FIG. 1 as including a mesh material on the sides.

The vertical support rails 18 extend upwardly a distance and terminate in shoulder brackets 52. Their coupling is through a frictional coupling between a vertical opening of the shaped shoulder brackets and the top of the vertical rails 54. The upper edges of the vertical support rails and the shoulder brackets are at a height to correspond with the intended height of the rails of the upper horizontal support so as to safely retain a child within the play yard 10. The shoulder brackets 52 are molded with a downwardly projecting horizontal opening of a size and shape to receive the adjacent ends of the rails 54 of the upper horizontal support. Securement between these rails and the shoulder brackets are by pivot pins 58 which will allow the rails to move from their assembled horizontal positions to their collapsed downwardly extending vertical positions.

The upper horizontal support is preferably in a generally rectangular orientation when assembled as shown in FIG. 1 with four (4) sides but constructed of eight (8) rails with hinges 60 centrally connecting the rails of each side. Cooperable with the hub 24 and pivots 30 and 58, the hinges constitute key components of the folding and locking mechanisms. Each hinge is of similar construction with central bores 62 for receiving the rail ends at their central location for rendering the upper horizontal support rectangular when assembled. The axes of the bores is the axis of the hinge. The hinge construction also allows the rails and hinges to extend upwardly in a vertical orientation when collapsed. Compare FIGS. 2A, 2B and 2C.

Figure 4:
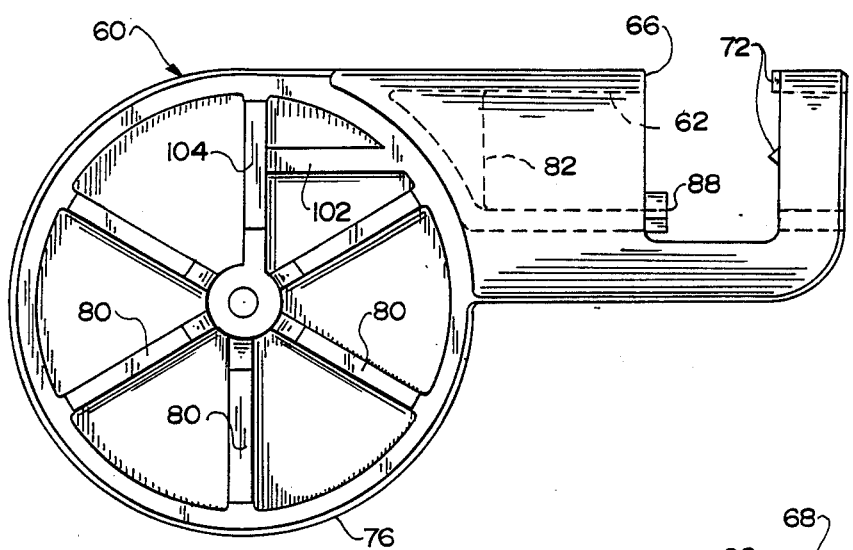
Figure 6:
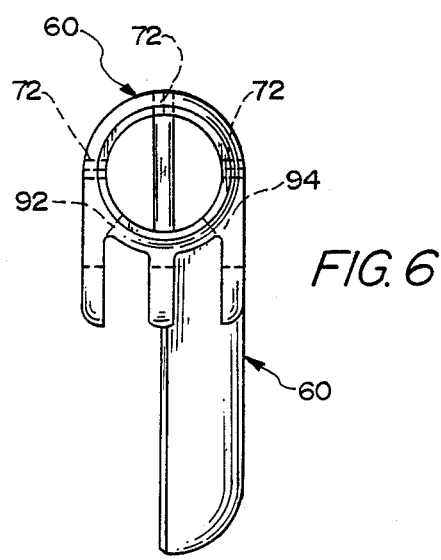
Figure 7:
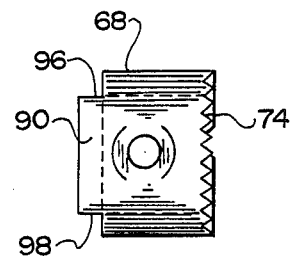
FIG. 7 is an elevational view of a ratchet ring of FIGS. 1, 2 and 3.

Details of the structure of each hinge is best seen by reference to FIGS. 3 through 6. Their mode of operation may be seen in FIGS. 2A, 2B and 2C. Each hinge is fabricated of two (2) major components or hinge halves 64. Each hinge half is of identical construction with an axial bore 62 for slidably receiving a rail end. Each hinge half also includes a circumferential slot 66 extending about one-hundred and eighty (180) degrees around its periphery. The slot is adapted to be positioned upwardly, note FIG. 2A, when the play yard is assembled and to extend downwardly, note FIG. 2C, when collapsed. A ratchet ring 68 is secured by a rivet 70 to each rail and projects radially outwardly from the received rail end through a hinge slot 66 to thereby allow the hinge components to be rotated one-hundred and eighty (180) degrees for facilitating locking and unlocking of the hinge and the assembly and collapse of the play yard. The ratchet teeth 72 and 74 generally hold the hinges 66 in proper rotational orientation, but rotation of the hinges by an operator will effect movement of the ratchet teeth 72 of the hinge 60 with respect to the ratchet teeth 74 of the ring 68 moving the hinges between rational orientations. The resilience of the ratchet teeth and hinge halves allows for rotational movement of the hinges about their axes.

The hinge halves have offset circular sections 76 which are joined together centrally by a pivot pin 78 extending through the hinge halves. Ribs 80 are located within the hinge halves 64 for strength and include a bottoming surface 82 for the ends of the rails 54.

Located on the facing surfaces 84 of the hinge halves 64 and ratchet rings 68, are offset projections 88 and 90 of an arcuate configuration with mating abutment surfaces 92, 94, 96 and 98 which function to limit the rotation of the hinges 60 and rails 54 with respect to each other. The abutment surfaces 92 and 96 are in contact with each other when the offset segments are in the downward locked position of FIG. 2A and the abutment surfaces 94 and 98 are in contact with each other when the offset segments are in the upward unlocked position of FIG. 2C. Abutment projections 88 and 90 each extend circumferentially for ninety (90) degrees. Consequently, full rotation of the hinges 60 from one position to another will rotate the hinges one-hundred eighty (180) degrees.

Located on the facing surfaces 84 of the hinge halves 64, extending into each associated hinge half, are offset projections 102 with mating abutment surfaces 104. When in the FIG. 1 orientation, the opposing abutment surfaces 104 preclude further rotation of the hinge halves and, therefore, securely hold the upper horizontal support 14 and the entire play yard 10 in a secure operational orientation. When, however, as shown in FIG. 2C, the hinge halves are rotated about pivot pin 78 and may be lowered to thereby allow for the bending of the hinge 60 and rails 54, the downward movement of the hinge 60 and the adjacent ends of the rails concurrent with the lifting of the hub 24. The entire collapse of the frame assembly of the play yard 10 may then be converted into the collapsed orientation.

The upper horizontal support 14 is preferably covered by a fabric hem 106 to render the hinges 60 and rails 54 less accessible to a child within the play yard. Similar hem material may be placed over the lower horizontal support 16 so that side material 50 may cover the space between the upper and lower horizontal supports. In order to attain access to the hinges, a flap 108 is preferably stitched to the hem material 96 along one (1) face of the hem. The other face of the hem is the flap 108 capable of being lifted to expose the hinges for their movement during assembly and collapse. The periphery of the flap is provided with a releasable pile-type fastener, such as velcro, matable with a similar releasable pile-type fastener along the periphery of the opening of the hem. As such, access to the hinges as well as their concealment is readily facilitated.

The system involves a very simple method of operation. Beginning with a play yard 10 in a folded condition, the operator would first straighten out the rails 54 of the upper horizontal support 14 wherein the hinges 60 are rotated about their central pivot 78. Once the rails are in the fully straightened condition, the hinges 60 would be rotated inwardly one-hundred eighty (180) degrees about the axes of the rails. This rotation about the axes of the rails would cause the hinge to hold the rails in an aligned horizontal position during the other straightening motion of the other three (3) sides. This is noted in the drawings provided at FIGS. 2A, 2B and 2C. With the hinges all rotated in the fully down position of FIG. 2A, the rails are locked in position and the hub 24 and its rails 22 and 32 fall to the FIG. 1 orientation for operation and use of the play yard. Folding up or collapse of the play yard simply involves the operator to perform these steps in the reverse direction.

The rails are preferably formed of a toxically safe material such as steel which is powder coated during fabrication with no solvents utilized. The foot and shoulder brackets as well as the hub and hinge materials are also toxically safe preferably being molded of a high polymer plastic. These various parts may be constructed of ABS, acetel or other moldable plastics of similar properties.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. An improved hinge comprising mating first and second halves, each half with an axial bore adapted to receive members to be pivoted with the hinge, an offset portion formed in each hinge half with a pivot pin extending centrally therethrough, the mating halves adapted to be pivoted about the axis of the pivot pin which is perpendicular to, but offset from the axes of the bores, interference members located on the hinge halves to limit the degree of pivoting of the hinge halves with respect to each other, circumferential slots extending through the surface of each hinge half for receiving a radially projecting ring securable to the received members to guide the rotational motion of the hinge with respect to the rings and received members.

2. The hinge as set forth in claim 1 and further including abutment surfaces on each ring and hinge half cooperable to limit the rotation of the hinge and thereby locate the offset portion vertically upwardly for constituting a hinge unlocked position and to locate the offset portion vertically downwardly for constituting a locked position.

3. The hinge as set forth in claim 2 wherein the ring is formed with ratchet teeth extending from one surface thereof cooperable with ratchet teeth in the adjacent hinge half for thereby securing the hinge in a locked or unlocked rotational orientation.

4. An improved hinge comprising mating first and second portions, an offset region formed in each hinge portion with a pivot pin having an axis extending centrally therethrough, the mating portions adapted to be pivoted about the pivot pin, a hinge axis located perpendicularly to, but offset from, the pivot pin, the hinge being rotatable about its hinge axis between a first orientation wherein the hinge axis portions are unlocked and may be pivoted about the hinge and a second orientation wherein the hinge axis portions are locked and may not be pivoted about the hinge.

* * * * *